United States Patent [19]
Masetti et al.

[11] Patent Number: 5,438,566
[45] Date of Patent: Aug. 1, 1995

[54] PHOTONIC SWITCHING NETWORK WITH BROADCAST FACILITY

[75] Inventors: Francesco Masetti, Marcoussis; Jean-Baptiste Jacob, Perros Guirec, both of France

[73] Assignee: Alcatel N.V., Amsterdam, Netherlands

[21] Appl. No.: 102,842

[22] Filed: Aug. 6, 1993

[30] Foreign Application Priority Data

Aug. 7, 1992 [IT] Italy .................... MI92A1959

[51] Int. Cl.⁶ .................... H04L 12/56; H04J 14/00
[52] U.S. Cl. .................................................... 370/60
[58] Field of Search .................... 370/60, 60.1, 62, 94.1, 370/94.2, 94.3, 65.5; 359/117, 118, 124, 128, 135, 139, 140

[56] References Cited

U.S. PATENT DOCUMENTS

| | | | |
|---|---|---|---|
| 4,734,907 | 3/1988 | Turner | 370/60 |
| 4,813,038 | 3/1989 | Lee | 370/60 |
| 4,991,171 | 2/1991 | Teraslinna et al. | 370/94.1 |
| 5,301,055 | 4/1994 | Bagchi et al. | 359/139 |

OTHER PUBLICATIONS

Eng et al. "Multicast and Broadcast Services in a Knockout Switch", IEEE, 1988, pp. 29–34.

*Primary Examiner*—Hassan Kizou
*Attorney, Agent, or Firm*—Sughrue, Mion, Zinn, Macpeak & Seas

[57] ABSTRACT

To enable a data packet to be broadcast from one input (I1) to a plurality of outputs (01, 02, 03, 06) the switching network comprises in each switching plane at least one stage (S2) comprising switches (SE4, SE5, SE6) adapted at least: to route multiple copies of a packet that has been multiplied on its upstream side (SE1), and to multiply a packet by forwarding it several times in succession to the same output; the copies thus created being routed subsequently by the switches (SE7, SE8, SE9) of a downstream stage (S3). The switching network has application to photonic ATM switching centers.

3 Claims, 6 Drawing Sheets

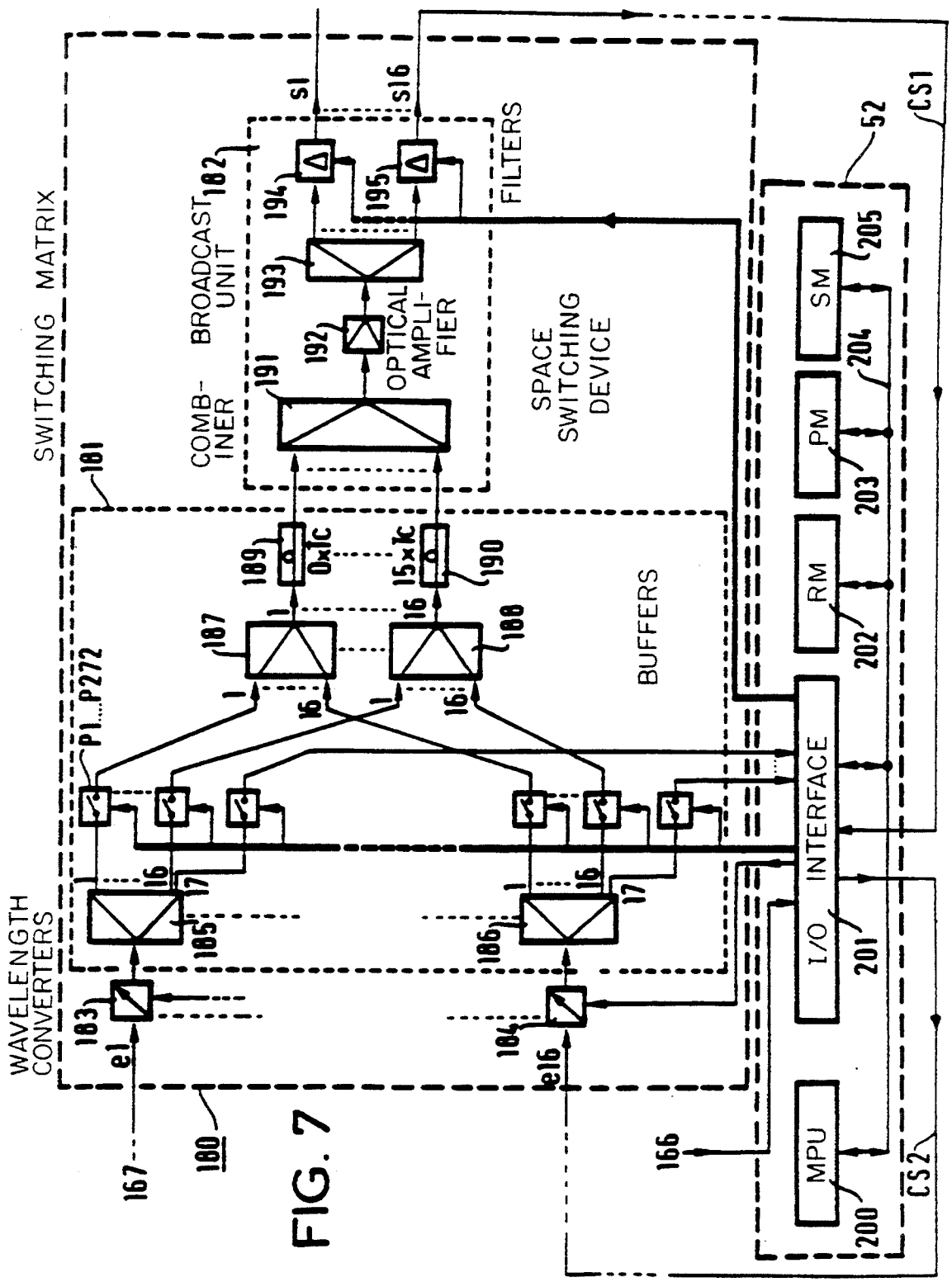

PHOTONIC SWITCHING NETWORK WITH BROADCAST FACILITY

The invention concerns a photonic switching network with the facility to broadcast data in the form of packets of any length, for example fixed length cells in the asynchronous transfer mode (ATM) format.

Time broadcasting entails multiplying (i.e. increasing the number of copies of) a packet and sending the copies serially. Space broadcasting entails multiplying a packet and sending the copies on parallel paths, with or without a slight time shift.

Electronic switching networks with this broadcast facility are known. For example, the article "Design of a broadcast packet switching network" by Jonathan S. Turner, IEEE Transactions on Communications, vol 36, No. 6, June 1988 describes a packet switch comprising:

- a first stage comprising a packet processor for each switching network input which attaches an internal routing label to each cell,
- a copier network providing on its outputs c copies of a packet with c destinations,
- group and broadcast translators associated with respective copier network outputs to determine a switching network output number for each packet leaving the copier network as a function of its broadcast channel number and as a function of routing data stored in said translators,
- a distribution network and a routing network connected in series to transfer packets supplied by the group and broadcast translators to the switching network outputs constituting the destinations for said cells, and
- the same packet processors associated with respective routing network outputs to eliminate the label associated with each data packet before forwarding said packet to a switching network output.

The copier network, the broadcast network and the routing network operate at 25 Mbit/s and comprise data paths transmitting eight bits simultaneously to allow the use of electronic technology.

The label associated with each data packet comprises three fields:

- a field indicating the data packet type: connection control packet, data transfer packet or datagram packet,
- a logical channel number indicating the connection to which said packet belongs,
- a source identifier field indicating which switching network input received the packet, and
- a routing field in three parts: a first part indicating the type of routing, essentially to distinguish broadcasting from other types of routing, and second and third parts whose meaning depends on the meaning of the first part.

For packets of a point to point connection the routing field contains a switching network output or output group number and a logical channel number. For packets to be broadcast the routing field contains a multiplier equal to the number of destinations for the same packet and a broadcast channel number for distinguishing this channel from all other switching network broadcast channels.

The routing of a packet in the switching network is determined by translating the logical channel number using a logical channel translation table in the packet processor at the input receiving the packet in question.

The logical channel number is used to address the translation table. Reading at this address yields the routing field for the label attached to the packet by the packet processor. The table is updated by a connection processor whenever a new connection is set up.

Each packet processor processes the packets arriving at one switching network input and the packets leaving at the same ranked switching network output. The incoming packets are in the form of an optical signal modulated by a binary bit stream. The packet processor converts this signal into eight parallel binary electrical signals. It applies the opposite conversion to outgoing packets and removes the internal routing label containing the routing, control and source fields.

When a packet is to be broadcast to c destinations the copier network reads the value c of the multiplier in the packet label and transfers the packet to c outputs of the copier network which comprises a plurality of switch stages. Each switch has only two outputs and on receiving a packet can forward only two copies of it. A copier network with 16 inputs, for example, has four stages each of eight switches to broadcast a packet to all 16 outputs. The copier network can only multiply a packet and cannot simultaneously route the packets as the possibilities for selecting outputs of each switch are extremely limited and are already used for possible duplication of each packet reaching the switch.

Each copy of a packet is routed to the switching network output to which it is addressed by the broadcast network and the routing network by means of a new value of the routing field placed in the packet label by the group and broadcast translator at each copier network output. Each translator contains a broadcast translation table which is addressed using the broadcast channel number in the packet arriving at the translator. The data read at this address is inserted into the packet label instead of the broadcast and routing data used in the copier network.

Advances in photonic technology indicate the feasibility of a switching network comprising switches implemented entirely or almost entirely in photonic technology. Implementing a switching network with the facility to broadcast data packets in the manner described above but with photonic switches would be less than optimal given the capabilities of photonic technology. The aim of the invention is thus to propose a photonic switching network with a broadcast facility having a simpler structure than known broadcast switching networks.

The invention consists in a photonic switching network for routing data packets between a plurality of inputs and a plurality of outputs comprising at least one switching stage comprising at least one switch adapted to route a packet according to an internal routing label associated with said packet;

characterized in that to broadcast a packet from one input to a plurality of outputs of the switching network it comprises at least one switching stage comprising at least one switch comprising:

- means for routing a packet to a plurality of outputs of said switch according to the contents of an internal routing label associated with said packet;
- means for forwarding a packet several times in succession at least to the output to which it has been routed, the number of times it is forwarded depending on the content of an internal routing label associated with said packet.

The above network provides a space and time broadcast facility without requiring a structure that is much more complex than a network providing only point to point connections because all the switching stages with the possible exception of the first and the last have a two-fold function: multiplication of a packet received from the previous stage and simultaneous routing of multiple copies of a packet multiplied by a previous stage.

If the means for forwarding a packet several times in succession can do so only to the same output to which the packet was previously routed the first stage can only carry out the multiplication function when a packet is to be broadcast as it does not receive packets already multiplied by a previous stage. To effect space broadcasting the last stage can carry out only the routing function as if it were to multiply packets they would leave serially via the same output because there are no subsequent stages to route the various copies to different destinations.

In one specific embodiment the routing and forwarding means are also able to forward the same packet several times to different outputs. This network can have an even simpler structure than the previous one because the first and last switching stages can then also implement two functions simultaneously: routing and multiplication. It is therefore feasible to reduce further the number of switching stages.

In one specific embodiment the network of the invention further comprises means for determining an internal routing label according to data received during a signaling phase prior to setting up each broadcast connection.

The invention will be better understood and other features of the invention will emerge more clearly from the following description and the accompanying figures:

FIG. 7 is a more detailed block diagram of another part of the second embodiment.

A network in accordance with the invention is particularly simple to implement if the packet length is fixed, as is the case with ATM cells, for example.

Figure 1:
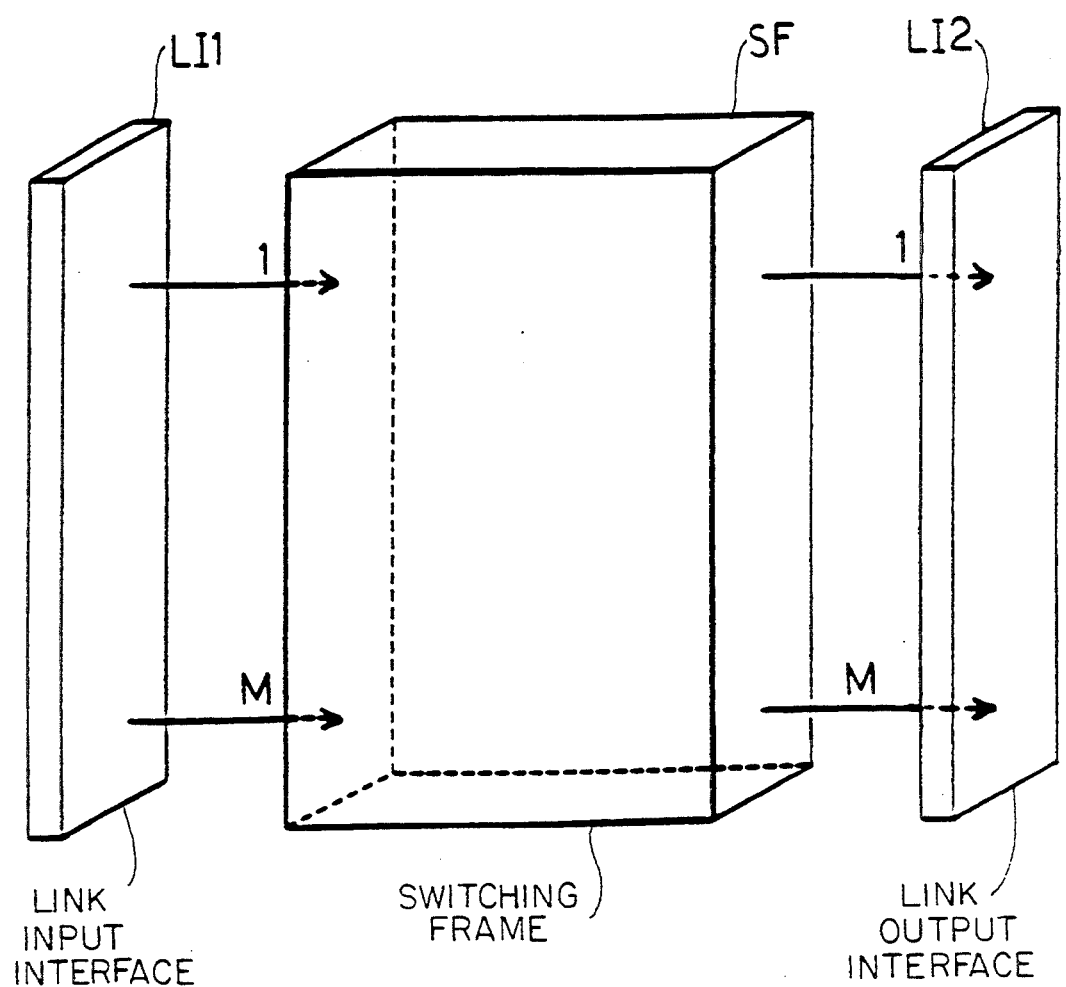
FIG. 1 is a general block diagram of a conventional broadband switching network in accordance with the invention.

A switching network in accordance with the invention may be as shown in FIG. 1 which is a block diagram of a conventional broadband switching network.

It comprises: a link input interface LI1, a switching frame SF having M inputs and M outputs and a link output interface LI2. The interface LI1 has M outputs numbered 1 through M in the figure connected to M respective inputs of the switching frame SF and M inputs (not shown) constituting the switching network inputs. The interface LI2 has M inputs numbered 1 through M in the figure connected to M respective outputs of the switching frame SF and M outputs (not shown) constituting the switching network outputs.

Each input receives and each output forwards fixed length data packets (ATM cells, for example) at a fixed bit rate of up to 2.6 Gbit/s.

Figure 2:
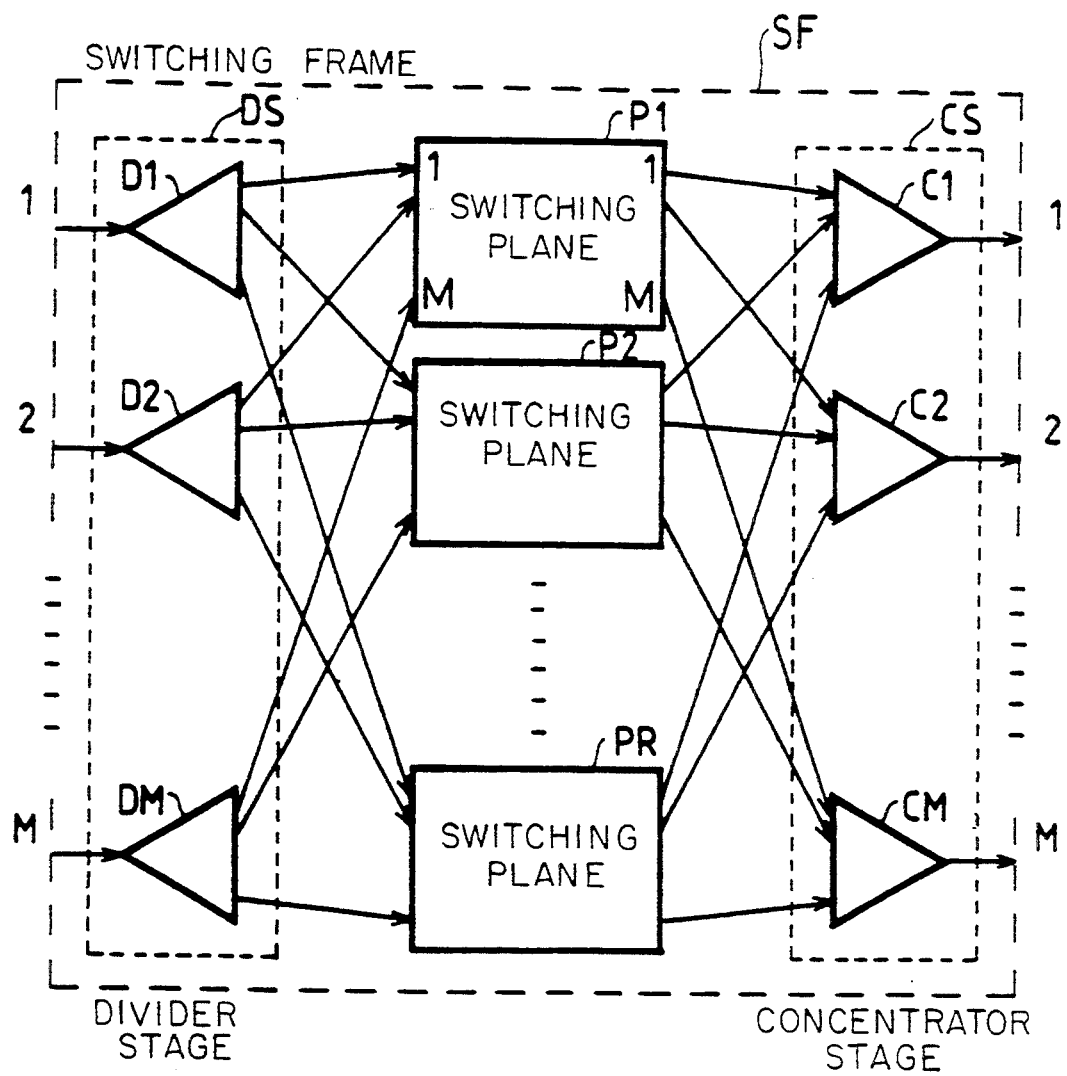
FIG. 2 is a general block diagram of part of the conventional switching network.

FIG. 2 is the block diagram of the switching frame SF from FIG. 1. It conventionally comprises R identical switching planes P1 through PR each having M inputs and M outputs, a divider stage DS at the input of the switching frame SF to divide the traffic between the R planes and a concentrator stage CS at the output to collect from the various planes all the cells addressed to the same switching network output. The divider stage DS comprises M dividers D1 through DM each having an input constituting one of the M inputs of the switching frame SF and R outputs connected to inputs of respective switching planes P1 through PR. The concentrator stage CS comprises M optical concentrators C1 through CM each having R inputs connected to outputs of respective switching planes P1 through PR and an output constituting one of the M outputs of the switching frame SF. Each plane P1 through PR comprises several stages of switches one embodiment of which is described later.

Each switch can automatically route a cell according to the contents of an internal routing label associated with the cell. This internal routing label is determined at the input of each switch according to data received previously by the switch.

If the connection requires a preliminary signaling phase, as with broadcast connections in particular, the data is stored in routing memories in the respective switches.

If the connection does not require a preliminary signaling phase, as with isolated cells on point to point links in particular, the data is stored in the same routing memories when the routing paths are updated.

Figure 3:
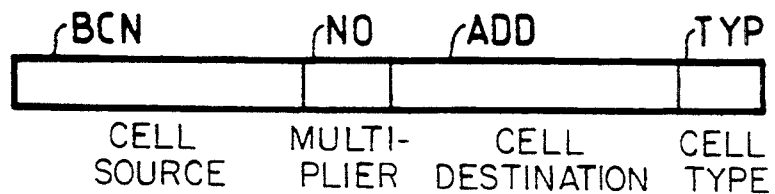
FIG. 3 shows the format of an internal routing label associated with a cell when it is to be broadcast to a plurality of switching network outputs.

FIG. 3 shows one format for the internal routing label in the case of a cell to be broadcast. A 2-bit field TYP indicates the cell type: empty cell, test cell, point to point cell or point to multipoint (broadcast) cell. An L-bit field ADD contains an address representing the destination of the cell. In the case of a cell to be broadcast the routing label further comprises a k-bit multiplier field NO indicating the number of copies of the cell to be forwarded to the switching network outputs and an h-bit broadcast channel number field BCN representing the source of all cells belonging to the same broadcast channel. This internal routing label format can of course be changed to suit the structure of the switching network, for example by increasing the number k of bits in the NO field to show a number of copies equal to the number of outputs of the switching network and by increasing h to cater for a greater number of broadcast channels.

The contents of the NO and BCN fields differ for the switches constituting the stages of a switching plane P1 through PR.

As broadcast connections are intended for speech or file transfer, for example, which take a long time, a switch might suffer from blocking if insufficient time were available to forward the cells to be broadcast. This can be prevented by restricting the bit rate Bb on each broadcast connection. This ensures that there are at most j successive broadcast cells sent in the same time slot and serialized in the queues of a switch where j is the number of copies of the same cell output by a switch with $j < 2^k$.

Consider the most difficult case in which all copies of a cell are forwarded to the same output of the switch that produces them.

A broadcast connection can be accepted during the set-up phase only if the bit rate Bb of the broadcast connection and the bit rate B1 of each link of a switch satisfy the condition:

$$Bb < B1/j$$

If not, a switch may suffer blocking by all cells produced by the broadcast procedure. In practise the number j of copies of the same cell output by a switch is limited to $2^k$ as there are only k bits in the internal routing label. The value of k is naturally chosen so that j is less than or equal to the number N of switch outputs.

For example, the bit rate Bb must be restricted to 350 Mbit/s if the bit rate B1 of each link of a switch is 2.6 Gbit/s and j=8.

There is a relationship between the broadcast capacity of a switching network and the multistage structure of the network.

Consider the case where the copies of a cell produced in a switch are forwarded serially to the same output of the switch and are then routed by subsequent stages. The total multiplier of a switching network is then limited to $J = j^{S-1}$ in a structure with S stages, naturally with the total number J of copies limited to the number M of switching network outputs. For the copies of the same cell to be able to reach all the M switching network outputs, if required, the number of stages must satisfy the condition:

$$S > 1 + \log_k M$$

This condition is independent of the structure of the connections between stages which are merely required to guarantee total accessibility.

Consider now the case where the copies of a cell produced in a switch can be forwarded to different outputs of the switch. A broadcast connection can be accepted during the set-up phase only if the bit rate Bb of this connection and the bit rate B1 of each link of a switch satisfy the condition:

$$Bb < B1 \cdot \tau$$

where $\tau$ is determined dynamically during the signaling phase according to the current load on the switches.

The total multiplier of a switching network is restricted to:
$$J = j^S$$

The number of stages must satisfy the condition:

$$S > \log_k M$$

In the switching network in accordance with the invention the restriction on the bit rate of a connection is essentially imposed by the capacity of each switch because blocking occurs within a single switch if several copies are forwarded to the same switch output.

There is not necessarily any blocking in the downstream switch because each copy is addressed to a different output of that switch.

Figure 4:
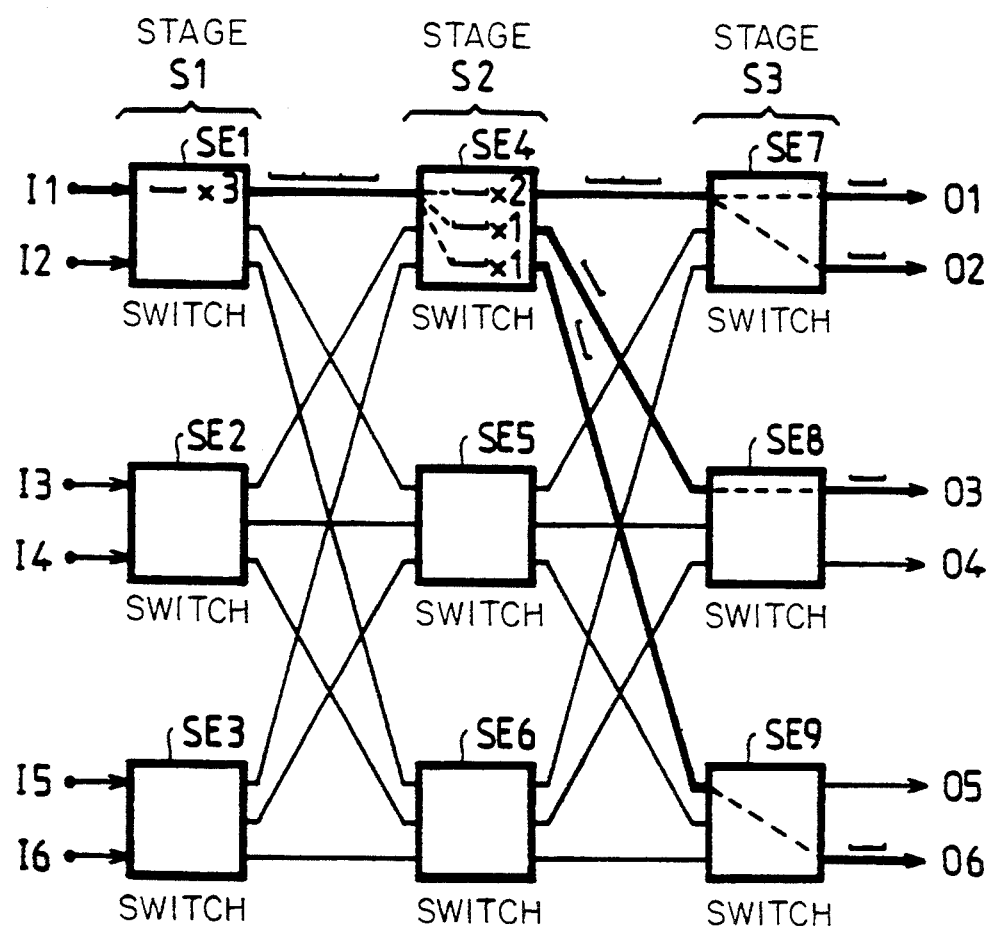
FIGS. 4 and 5 show two examples of cell broadcasting in a first and second embodiment of a switching network in accordance with the invention.
Figure 5:
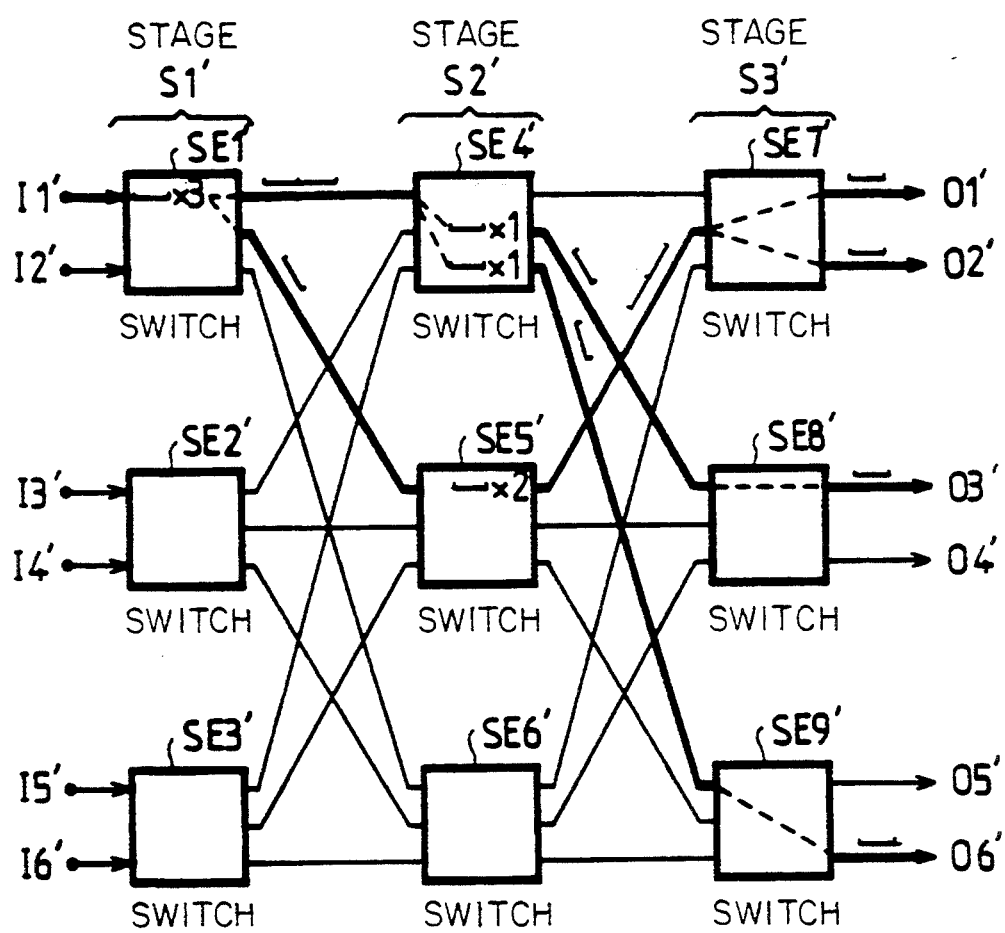

FIGS. 4 and 5 show two examples of cell broadcasting in two embodiments of a non-blocking switching plane. In the first example the switching plane comprises nine switches SE1 through SE9 divided between three stages S1, S2, S3. The first stage S1 comprises three identical switches SE1, SE2, SE3 having two inputs and three outputs. These inputs constitute the inputs I1 through I6 of the non-blocking switching plane. The second stage comprises three switches SE4, SE5, SE6 each comprising three inputs connected to respective switch outputs of the first stage S1 and three outputs each connected to a switch input of the third stage S3. The third stage S3 comprises three identical switches SE7, SE8, SE9 each having three inputs connected to a respective switch output of the second stage S2 and two outputs constituting the outputs 01 through 06 of the switching plane.

The switching plane shown in FIG. 4 comprises switches SE1 through SE9 operating as follows: the wavelength of a cell applied to an input is converted according to its destination and the cell is then stored in a buffer. It is forwarded to an output via a filter tuned to the same wavelength as the cell. The copies of the cell can be multiplied by reading the same cell more than once in the buffer. As a result, all copies of a given cell produced by the switch must have the same wavelength.

The output filters of the switches SE1 through SE9 in FIG. 4 are tuned to a fixed wavelength. Consequently, copies of the same cell produced in the switch in question must be forwarded serially to the same switch output as they all have the same wavelength. However, copies of the same cell produced by different switches upstream of the switch in question may have different wavelengths and may therefore be forwarded to different outputs of the latter switch. In other words, a switch SE1 through SE9 cannot multiply and then route the same cell. These two operations must be performed by two successive stages.

The same stage can nevertheless carry out multiplication and routing simultaneously for copies of two separate cells: it can multiply without routing a first cell, whether it has been multiplied by an upstream switch or not, and it can route multiple copies of a second cell previously multiplied in an upstream stage as it can allocate them different wavelengths.

In the FIG. 4 example a cell applied to input I1 of the switching plane must be broadcast in four copies to outputs 01, 02, 03 and 06 of the switching plane. Field NO of the internal routing label initially associated with the cell contains the value 4 and the ADD field designates outputs 01, 02, 03 and 06.

In this example the switch SE1 routes the cell to its first output and then forwards it again three times in succession. Switch SE4 of the second stage S2 receives the three successive copies and routes the first to its first output and forwards it again twice in succession, routes the second copy to its second output and forwards it again once and routes the third copy to its third output and forwards it again once.

Switch SE7 of stage S3 receives two successive copies of the cell, routes them to respective outputs which constitute outputs 01 and 02 of the switching plane and forwards each copy again once. Switch SE8 of stage S3 receives one copy supplied by SE4, routes it to its first output which constitutes output 03 of the switching plane and forwards it again once. Switch SE9 of stage S3 receives a copy supplied by SE4, routes it to its second output which constitutes output 06 of the switching plane and forwards it to this output again once.

Thus multiplication only is effected in stages S1 and S2 and routing is effected in stages S2 and S3. To be more precise, stage S2 performs routing and multiplication on separate cells. It routes to different outputs copies of the same cell created at the same output of an upstream stage. It multiplies (i.e. produces multiple copies of) a cell, without routing them, by forwarding the same cell several times to the same output. Operation as described for this example thus requires at least one intermediate stage (e.g. stage S2) comprising switches capable of multiplying and routing cells.

FIG. 5 shows an example in which operation is different even though the switching plane block diagram is the same as in FIG. 4 and the end result is the same, namely broadcasting of a cell from input I1' to outputs 01', 02', 03' and 06'.

The switching plane shown in FIG. 5 comprises switches SE1' through SE9' and its block diagram is the same as FIG. 4. The switches operate slightly differently than switches SE1 through SE9 as their output filters can be tuned electrically. Consequently several copies of the same cell produced in the switch in question and therefore having the same wavelength can be routed to several different outputs of the switch concerned. In other words, the same switch can multiply a cell and then route the copies to different outputs.

In this example switch SE1' of stage S1' receives the cell to be broadcast and first multiplies and then routes it. To be more precise it creates three copies of the original cell and then routes two of these copies to its first output and the third copy to its second output.

The second stage S2' performs a routing function and then a multiplication function in the same way as in the FIG. 4 example. The switch SE4' receives two successive copies that it routes to its second and third outputs, respectively, and forwards them again once to each of these outputs. Switch SE5 of stage S2' receives one copy of the cell, routes it to its first output and then forwards it again twice in succession to this first output which is connected to the second input of switch SE7' of stage S3'. Switch SE7' routes the two copies to respective outputs and forwards them again once to these two outputs, which constitute outputs 01' and 02' of the switching plane.

Switch SE8' of stage S3' receives one copy supplied by the second output of switch SE4, routes it to its first output and then forwards it again once to this output which constitutes the output 03 of the switching plane. The first input of switch SE9' of stage S3' receives one copy supplied by the third output of switch SE4, routes it to its second output and then forwards it again once to this output which constitutes output 06' of the switching plane.

For this mode of operation it would seem that switches SEi', SE2', SE3' of the first stage S1' must be able to perform multiplication first to produce further copies of the cell and then routing while switches SE4', SE5', SE6' of the second stage S2' must perform first routing and then multiplication.

The person skilled in the art will elect one of the two types of operation described above with reference to FIGS. 4 and 5 according to the type of switch available. If they can perform routing and multiplication only in that order, operation of the switching plane will be as shown in FIG. 4. If they can perform routing and multiplication in either order, operation will be as shown in FIG. 5 which has the advantage that it may be possible to reduce the number of stages as the first stage S1' can carry out some of the routing of the copies that it produces.

Figure 6:
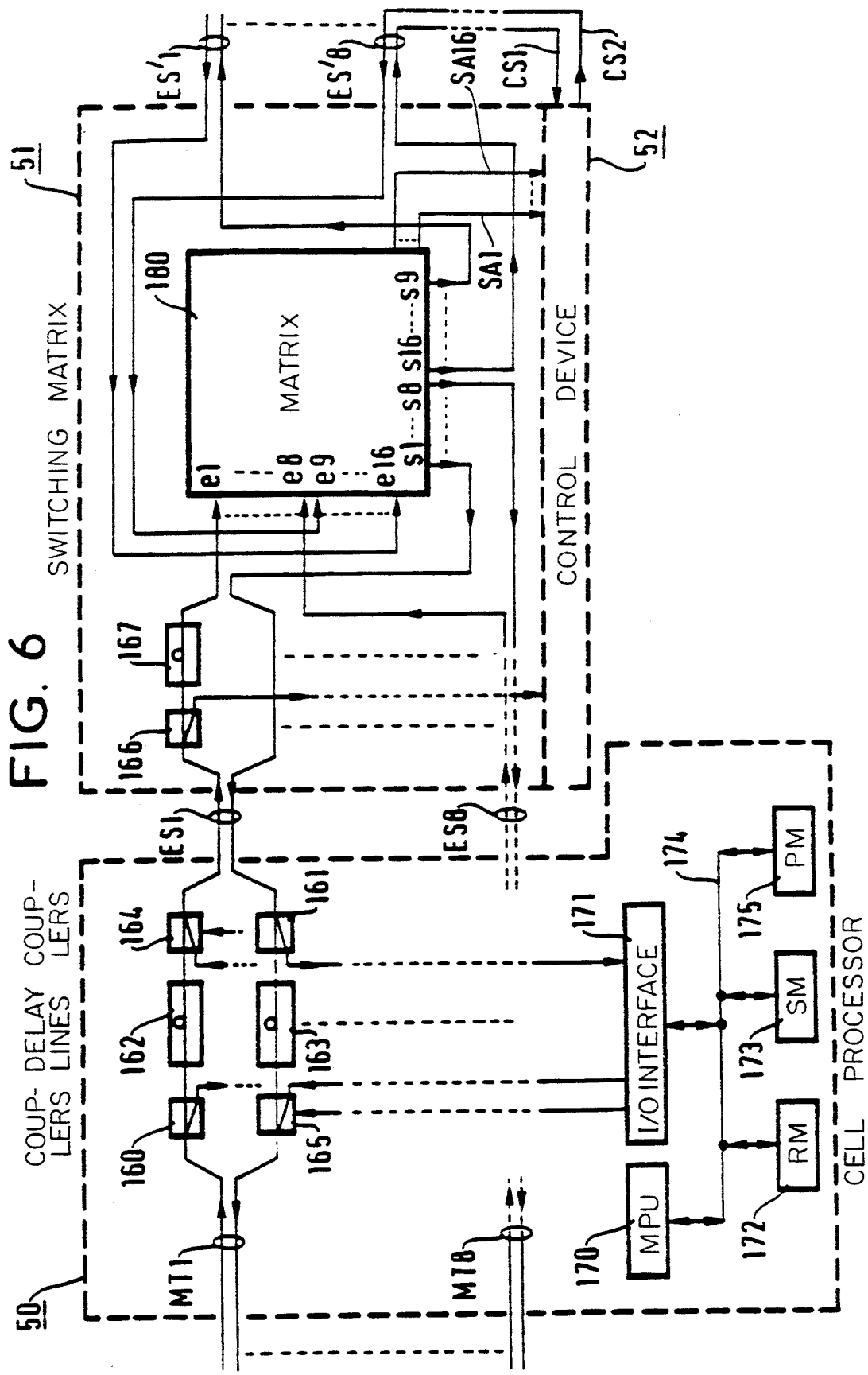
FIG. 6 is a more detailed block diagram of the second embodiment of part of a switching network in accordance with the invention.

FIG. 6 is the block diagram of one embodiment of a switch such as the switches SEi' through SE9' in FIG. 5. In this embodiment cells can be routed and multiplied in any order. A simplified version described later performs routing and multiplication only in that order and is therefore equivalent to switches SE1 through SE9.

The example shown comprises a cell processor 50 connected to optical fibers carrying respective asynchronous time-division multiplexes MT1 through MT8, a switching matrix 51 connected by optical input-outputs ES1 through ES8 to the cell processor 50 and by optical input-outputs ES'1 through ES'7 to another stage (not shown) of the switching network, and a control device 52 associated with the matrix 51.

An input-output ES'8 of the matrix 51 is connected to an input-output of the control device 52 by a duplicated connection CS1, CS2 shown in dashed line because it may pass through control devices 52 of other switches of the same switching plane to enable the exchange of control and signaling cells between the control devices 52.

The matrix 51 comprises a matrix 180 with 16 inputs (the rows of the matrix 180), 16 outputs (the columns of the matrix 180) and 16 auxiliary outputs SA1 through SA16. Each input-output ES1 through ES8 of the matrix 51 is therefore made up of a separate input and output respectively connected to one of the 16 inputs e1 through e16 of the matrix 180 and to one of the 16 outputs s1 through s16 of the matrix 180. The matrix 51 further comprises 16 three-port couplers and 16 delay lines so that the control bits, in particular four routing bits in each cell, can be sampled and supplied to the control device 52.

Input-output ES1, for example, is connected to input e1 of the matrix 180 by a coupler 166 in series with a delay line 167 which introduces a time-delay equal to the processing time of the device 52 for interpreting control bits of the internal routing label. Input-output ES1 is also connected direct to output s1 of the matrix 180. One port of the coupler 166 is connected to one input of the control device 52 whose block diagram is explained in more detail later.

The cell processor 50 comprises eight pairs of three-port couplers 160, 161, etc, eight pairs of delay lines 162, 163, etc and eight pairs of three-port couplers 164, 165, etc with an electrical control input. Each bidirectional multiplex MT1 through MT8 is routed in the cell processor 50 by two unidirectional channels, doubling the component count of this device. The cell processor 50 further comprises:
- a microprocessor 170,
- an input-output interface 171,
- a routing memory 172,
- a signaling memory 173,
- a pointer memory 175, and
- a bus 174 linking all the above components.

The cells pass in turn through the coupler 160, the delay line 162 and the coupler 164. The coupler 160 is a passive coupler whose third port is connected to an input of the interface 171 to send it five octets constituting the standard header of each cell. The delay line 162 introduces a time-delay equal to the time taken by the microprocessor 170 to process the header.

In each switch of a switching plane and for each cell the microprocessor 170 and the routing memory 172 deduce from external routing information contained in the standard header (virtual circuit identifier and virtual circuit group identifier) an internal routing label as described with reference to FIG. 3 using data contained in the routing memory 172.

The coupler 164 is an active coupler and enables insertion of a new header into the cell, preceded by a new routing label. For this purpose the coupler 164 has a third port connected to an optical output of the interface 171 and an electrical control input connected to an output of the interface 171 supplying an electrical enabling signal. It is also used to forward signaling or maintenance cells in place of empty cells.

The signaling memory 173 stores signaling cells incoming to or outgoing from the switching network 5, for example signaling cells from or to a control system of the telecommunication network as a whole.

The control device 52 sets up and clears down connections and performs various switch management and maintenance operations. The cell processor 50 handles link level protocol functions. Part of the optical signal arriving on the multiplex MT1, for example, is split out by this coupler 160 while the remainder is delayed by the delay line 162 to give the cell processor 50 time to process the header of each cell. The input output interface 171 handles optical to electrical conversion and vice versa to enable the use of electronic components such as fast access dual-ported silicon memory devices.

The microprocessor 170 reads the five octets of the standard header of each cell, decodes them, corrects any errors, identifies a virtual circuit or a virtual circuit group and converts this information into an internal routing label. The header of each cell is then updated and the internal routing label associated with it for the duration of processing in the switch concerned. The updated header and the internal routing label are associated once more with the data constituting the cell by the coupler 164 on the output side of the delay line 162. Synchronism is maintained so that the old header is replaced exactly by the new header. The associated internal routing label can be sent at a slower rate, for example 150 Mbit/s, to enable use of a control device 52 implemented in conventional electronic technology.

The format of the internal routing label determined by the cell processor 50 is as described with reference to FIG. 3 and includes n=16 bits, for example. The control device 52 first checks the TYP field to see if it is an empty cell, a test cell, a cell to be sent point to point or a cell to be broadcast to multiple points. An empty cell is used only to synchronize the switching network and then abandoned. A test cell is always routed to a specific output of the matrix 180.

This specific output is either the output s16 connected to the input-output ES'8 of the matrix 51 for communicating with one of the control devices 52 of the switching plane or one of the auxiliary outputs SA1 through SA16 for communicating directly with the control device 52 associated with the matrix 51 in question.

The control device 52 sets up all connections between the inputs and outputs of the matrix 51.

The control devices 52 of the various switches of the same switching network plane exchange control cells containing information concerning connection requests and routing and control data used by the microprocessors 170 of the cell processors 50 to determine the data stored in the routing memory 172 of each cell processor 50. The control cells are also used to transfer management and maintenance information to prevent blocking for example and for software and hardware tests.

A cell containing information to be transmitted point to point is routed to the output of the matrix 180 corresponding to the destination of the cell designated by the ADD field of the internal routing label.

In the case of a broadcast cell the control device 52 also reads the NO field containing the number of copies to be forwarded and the BCN field containing the number of the broadcast channel of this cell.

FIG. 7 shows a more detailed block diagram of the switching matrix 180 and the associated control device 52 which comprises a microprocessor 200, an input-output interface 201, a routing memory 202, a pointer memory 203, a signaling memory 205 and a bus 204 interconnecting all these components. The switching matrix 180 comprises 16 wavelength converters 183, 184, a buffer 181 and a space switching device 182. The converters 183, 184 have 16 inputs connected to respective inputs of the buffer 181, 16 outputs connected to respective inputs of the buffer 181 and 16 electrical control inputs connected to respective outputs of the interface 201 of the control device 52.

An input of the interface 201 is connected to the output s16 of the matrix 180 by a link CS1, optionally via other control devices 52 of other switches of the same plane. An output of the interface 201 is connected by the link CS2 to the input e16 of the matrix 180. These links are used to exchange control and signaling cells relating to the connections.

The space switching device 182 transfers each cell received on one of the 16 inputs e1 through e16 of the matrix 180 to one of the 16 outputs s1 through s16 of the matrix 180. The buffer 181 delays transfer of the cells to the device 182 to resolve contention problems, i.e. conflict between two cells arriving simultaneously and addressed to the same output of the matrix 180. It must be possible to store in 16 FIFO queues cells addressed to any of the 16 outputs s1 through s16. In the switching matrix 180 the cells can assume Q=16 different colors because of the converters 183, 184 and the cell colors distinguish 16 queues corresponding to 16 respective outputs while storing the cells in a set of delay lines common to all these outputs. The queues are managed by the microprocessor 200 using pointers stored in the pointer memory 203.

The value of each pointer is between 0 and the number Q of delay lines that the memory 181 includes. The next cell to be stored in a given queue is written into the qth delay line if the queue pointer is equal to q and if q is less than or equal to Q. If q=Q+1 the queue is saturated and the cell is lost as it cannot be written into the buffer 181.

The converters 183, 184 are controlled electrically by the microprocessor 200 via the interface 201 according to the six bits of the ADD field extracted from the routing label by the control device 52. Four of these bits represent the number of the output to which the cell is addressed. The color assigned to the cell is respective to this output of the matrix 180.

The routing memory 202 stores:

- control parameters for the converters 183, 184 used to assign a color to each cell according to the output to which it is addressed, and

- an indicator for each cell showing if it belongs to a point to point connection or a point to multipoint connection, in which latter case the routing memory 202 supplies parameters for tuning a plurality of filters at the output of the space switching device 182.

If Q=15 and N=16 the buffer 181 comprises 16 broadcast units 185, 186, two hundred and seventy two optical gates P1 through P172, 16 combiners 187, 188 and 16 delay lines 189, 190 with respective time delays equal to 0, Tc, 2Tc, 3Tc, etc up to 15Tc, where Tc is the cell period. The delay lines can apply to any cell a time delay between 0 and 15Tc regardless of its color. The broadcast units 185, 186 each have an input constituting one of the 16 inputs of the buffer 181 and 17 outputs connected to 17 of the 272 optical gates P1 through P272. 16 of the 17 outputs of each broadcast unit are connected by respective optical gates to a respective input of one of the 16 combiners 187, 188. The 17th output is connected by an optical gate to one output SA1 through SA16 of the matrix 180. This output is connected to an input of the input-output interface 201 of the control device 52.

This input of the interface 201 has an optical-electronic converter (not shown) and enables the microprocessor 200 to receive the content of signaling cells addressed to the control device 52 in question and concerning connections via the matrix 180 in question. Each input of each of the combiners 187, 188 is therefore connected by one of the gates P1 through P272 to an output of one of the broadcast units 185, 186. Thus any cell incoming on any of the 16 inputs of the matrix 180 can be passed through any of the 16 combiners 187, 188 by opening one of the gates P1 through P272 which are controlled independently of each other by the microprocessor 200 via the interface 201.

Each combiner 187, 188 has an output connected to one of the delay lines 189, 190. The control device 52 decides to delay by an amount between 0 and 15Tc each cell incoming on one of the 16 inputs of the matrix 180 according to the pointers in the memory 203 which are used to monitor the flow of cells addressed to each of the 16 outputs and to determine the time delay applied to each cell. The buffer 181 behaves like 16 FIFO queues respective to the 16 outputs of the memory 180.

The number of cells that can be stored in each queue is set by the number Q of delay lines 189, 190. In this embodiment this number is 16. The article "Buffer Sizing in an ATM Switch for both ATM and STM Traffics", International Journal of Digital and Analog Cabled Systems, vol 2, pp 247–252 (1989) shows that an output buffer with a capacity of 16 cells per output has a cell loss rate of $10^{-10}$. A given loss rate can be obtained by selecting an appropriate number Q of delay lines 189, 190.

In this embodiment the switching network matrices also change the order of the cells addressed to a concentrator. Their initial order is known from two routing bits among the six bits of the ADD field of the internal routing label. To return them to this initial order they must be read out in this order from the buffer 181. The queue of each output multiplex is managed by the microprocessor 200, the routing memory 202 and the pointer memory 203 as four independent "sub-queues" for storing the 1st, 2nd, 3rd and 4th cells, respectively.

Consider the queueing of four cells to be sent in the order C1, C2, C3, C4 to a given output of the matrix 181 after arriving at the inputs of the matrix 181 in the order C2, C1, C4, C3, for example. Cell C2 is written into the second sub-queue, C1 into the first sub-queue, C4 into the fourth sub-queue and C3 into the third subqueue. The write sub-queue is chosen from the four subqueues of the queue for the given output by means of the two routing bits giving the rank of each cell. The read sub-queue is chosen periodically: first, then second, then third, then fourth, and so on.

The space switching device 182 comprises:
- a combiner 191 having 16 inputs connected to respective outputs of the buffer 181 formed by the outputs of the 16 delay lines 189, 190,
- an optical amplifier 192 amplifying the optical signal supplied by an output of the combiner 191,
- a broadcast unit 193 having an input connected to the amplifier 192 and 16 outputs, and
- 16 filters 194, 195 each having an input connected to a respective output of the broadcast unit 193, an electrical control input connected to an output of the interface 201 and selecting one of 16 colors and an output constituting one of the 16 outputs s1 through s16 of the switching matrix 180.

The combiner 191, the amplifier 192 and the broadcast unit 193 feed all cells leaving the buffer 181 to the 16 filters 194, 195. Each filter passes only the color selected by the electrical control signal supplied by the control device 52 for each cell period. Each usually filters a different color to route a cell from one point to a single other point.

In some cases, for example to broadcast a message simultaneously to several destinations, several filters for several destinations of the same cell can be caused to filter the same color.

To create multiple copies of the same cell it is stored more than once, with the same wavelength, in the queues respective to several outputs. To route these copies to these outputs the frequencies to which the filters 194, 195 are tuned and corresponding to these outputs are all set equal to the wavelength of the cell at the time these outputs are available to send the respective copies. The switching plane then operates as described with reference to FIG. 5.

In an alternative embodiment the electrically tuned filters 194, 195 are replaced with simpler filters with fixed tuning. All copies of the same cell created in the matrix 180 are then necessarily output serially through the same filter 194, 195 and thus via the same output s1 through s16. The switching plane then operates as described with reference to FIG. 4.

The networks described by way of example above carry data packets having the standard ATM format but the invention is compatible with any other type data packet, of fixed length or otherwise. The invention is also compatible with architectures having only one switching plane.

We claim:

1. Photonic switching network for routing data packets between a plurality of inputs and a plurality of outputs, characterized in that to broadcast a packet from one input to a plurality of outputs of the switching network, it comprises at least two switching stages comprising at least one switch comprising:

a plurality of tunable wavelength converters at respective inputs of the switch to assign a wavelength to each packet applied to an input of the switch;

optical buffers common to all the outputs of the switch for receiving packets from the tunable wavelength converters and storing each packet for a duration selectable between 0 and $KT_c$ where K is an integer and $T_c$ is the duration of each packet;

a space routing stage comprising a tunable filter for each output of the switch, receiving packets from the optical buffers and passing to a given output only packets having a given wavelength; and control means for controlling said converters, said filters, and said buffers to forward a same packet several times in succession at least to one output, the number of times it is forwarded depending on the content of an internal routing label associated with said packet.

2. Network according to claim 1 characterized in that said switch further comprises means for determining the internal routing label according to data received during a signaling phase prior to setting up a broadcast connection.

3. Network according to claim 1, characterized in that the control means can forward the same packet several times to different outputs of the switch.

* * * * *